UNITED STATES PATENT OFFICE.

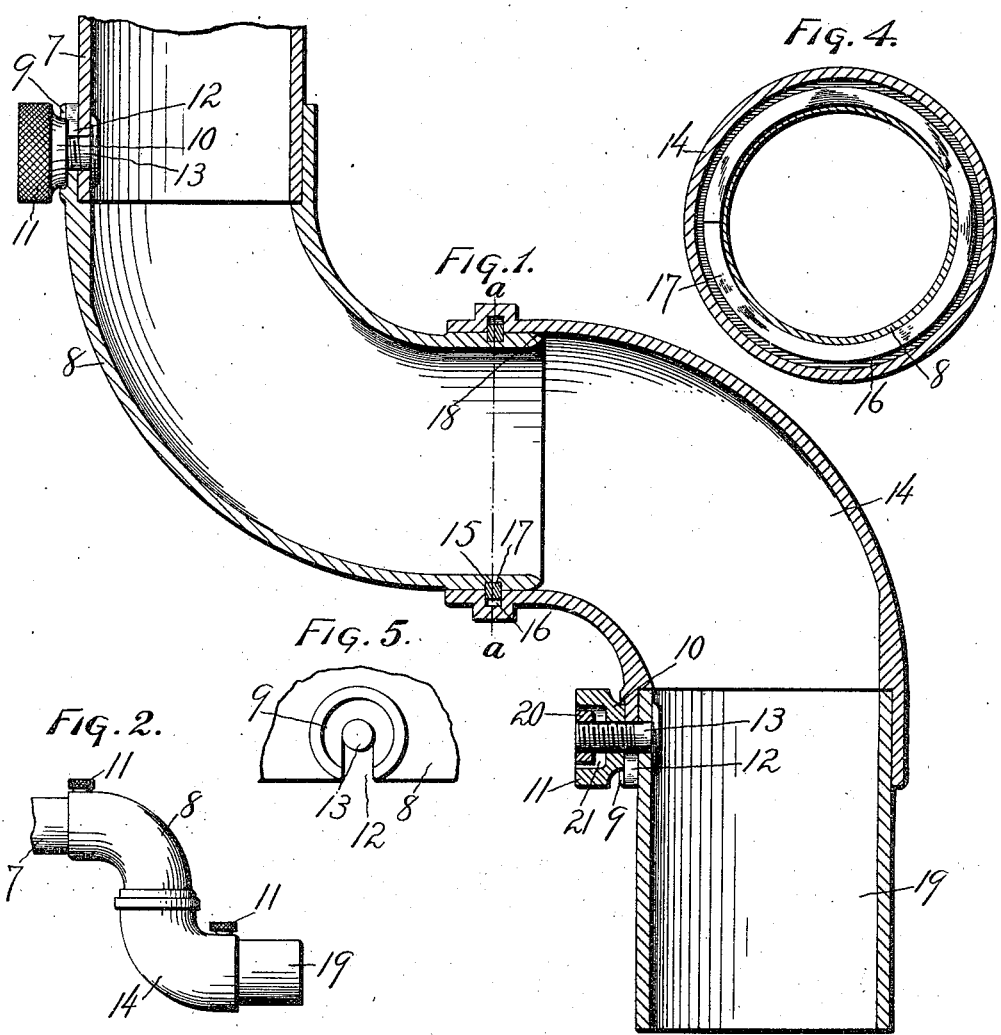

IRA H. SPENCER, OF HARTFORD, CONNECTICUT, ASSIGNOR TO THE SPENCER TURBINE CLEANER COMPANY, OF HARTFORD, CONNECTICUT, A CORPORATION OF CONNECTICUT.

HOSE CONNECTION.

981,705.  Specification of Letters Patent.  Patented Jan. 17, 1911.

Application filed January 9, 1907. Serial No. 351,446.

*To all whom it may concern:*

Be it known that I, IRA H. SPENCER, a citizen of the United States, and a resident of Hartford, in the county of Hartford and State of Connecticut, have invented a new and Improved Hose Connection, of which the following is a specification.

My improvement relates more especially to the class of devices employed for connecting a flexible hose to a rigid part, and the object of my invention is to provide a connection which shall prevent kinking of the hose and undue wear by movement of the connected parts; and a further object of the invention is to provide a connection especially applicable to a hand tool which shall enable the latter to be freely and readily operated, and at the same time prevent undue wear of the hose connected therewith; and a further object of the invention is to provide means for readily connecting and disconnecting the parts. A form of device in the use of which these objects may be attained is illustrated in the accompanying drawings, in which—

Figure 1 is a view on enlarged scale, in central lengthwise section, through one end of a tool handle and an attachment showing my improved means for attaching a hose thereto. Fig. 2 is a side view of the same, scale reduced. Fig. 3 is a side view of a conductor used in cleaning apparatus, and to which my device is especially applicable, scale reduced. Fig. 4 is a view in cross-section on the line a—a of Fig. 1. Fig. 5 is a view showing the slot and recess for locking the parts in engagement.

In the accompanying drawings the numeral 5 indicates a conductor, which is a tool applied to the surface of a floor, fabric, walls and the like for the purpose of removing dirt therefrom by means of a current of air passed through the conductor. One end is formed into a receiver 6 and the opposite end is adapted for the connection of a hose.

Previous to my invention a hose has been secured directly to the end of the handle 7, producing a short bend in the hose near its point of connection, and the various positions in which the conductor is placed and the continual movement incident to such use, has caused the hose near its connection with the handle to be unduly worn in use. To obviate this difficulty I have provided a pivotal connection between the handle 7 and the hose. In carrying out my invention I provide a pivoted elbow including a mouth piece 8 which is secured to the end of the handle 7. In securing this member to the handle the latter is preferably inserted within the end of the mouth piece 8, a recess 9 being formed in outer surface thereof. This recess is of a size to receive the bottom 10 of a lock nut 11. A slot 12 extends from the end of the mouth piece 8 to a point underneath the center of the recess 9, and a stud 13, secured to the end of the handle 7, projects through said recess and slot and is threaded for the reception of the nut 11.

When the parts are in locked position, as shown in Fig. 1 of the drawings, the bottom of the lock nut 11 is seated at the bottom of the recess 9, the mouth of which, opening in the same direction as the slot 12, is smaller than the diameter of the bottom of the nut 11. When the parts are to be disconnected the nut is turned until its bottom is removed from the recess, when the parts can be readily separated, the stud 13 passing out through the slot 12.

The hose inlet member 14 of the elbow is pivotally connected to the mouth piece 8 by a joint packed against the escape of air. In the form herein shown a groove 15 is made in the outer surface of the mouth piece 8 of the elbow, and another groove 16 is formed on the inner surface of the inlet member 14. A ring 17 of a size to fit these grooves is employed for holding the parts in engagement. The groove 16 is of a depth equal to or slightly greater than the thickness of the ring 17, the latter being split as shown in Fig. 4. By expanding the ring it is located entirely within the groove 16, so that the end of the mouth piece 8 may be passed into the inlet member 14. The end of the mouth piece may be beveled, as shown at 18 in Fig. 1 of the drawings, to readily permit the engagement of the parts. When the grooves are placed opposite each other the ring springs into the position shown in Fig. 1, securely locking the parts against disengagement.

A nipple 19 for the reception of a hose is removably secured to the inlet member 14 of the elbow, the means employed being the same as described in connection with the attachment of the handle to the mouth piece 8 of the elbow, these parts being shown in section and being lettered the same as hereinbefore described. The stud 13 is provided with a stop 20 secured to its outer end and within a recess 21 in the lock nut 11.

The material taken up by the nozzle 6 when the tool is used as a suction pneumatic cleaner, is liable to contain bits of thread or other fibrous substances liable to clog the tool, especially its joints, if allowed to have a momentary lodgment. To guard against this I make the opening through the coupling or elbow unobstructed, so there are no eddies formed in the moving air currents.

What I claim as my invention and desire to secure by Letters Patent is:—

1. A pair of conducting tubes adapted to fit together telescopically end to end, a recessed seat formed near the end of one of said tubes, the tube being slotted from its end to the said seat, a screw threaded pin carried by the other tube and arranged when the tubes are fitted together to enter the slot, a nut upon the said pin adapted when screwed down to set into the said seat, the nut having a recess in its outer face, and a head at the end of the pin adapted to enter the recess in the nut when the latter is screwed outward upon the pin.

2. The combination with a pair of conducting tubes adapted to fit together telescopically end to end, of a rib formed near the end of one of said tubes and arranged to form a seat, the said tube having a slot extending from its edge and terminating within the rib, a pin carried by the other tube arranged to extend through the slot, the nut provided with a recess arranged to engage the said pin and rest in said seat for locking the two tubes together, and a stop on the free end of the pin adapted to be received in the recess in the nut for preventing the disengagement of the nut from the pin, substantially as set forth.

3. In a pneumatic cleaning device, the combination of a hand tool having at its outer end an attachment adapted to be applied to the surface to be cleaned, a hose or conducting pipe, an elbow connecting the hand tool and pipe, the said elbow comprising two curved parts, the opposite ends of each part opening in directions substantially at right angles to each other,—and arranged to telescope together, and means between the telescoping portions of the two parts for locking them together, while permitting one of them to swivel.

4. In a pneumatic cleaning device, the combination of a hand tool having at its outer end an attachment adapted to be applied to the surface to be cleaned, a hose or conducting pipe, the said parts, hand tool and hose being adapted to lie in planes parallel with each other, an elbow connecting the hand tool and pipe, the said elbow comprising two curved pipes, the opposite ends of each pipe opening in directions substantially at right angles to each other and one of said pipes being arranged to fit closely inside of and lie parallel with the inner wall of the other pipe whereby there is formed a joint whose axis is at substantially right angles to the aforesaid parallel planes, and means between the inter-fitting ends for locking the pipes together, while permitting one of them to swivel.

IRA H. SPENCER.

Witnesses:
ARTHUR B. JENKINS,
LENA E. BERKOVITCH.